(12) United States Patent
Iizuka et al.

(10) Patent No.: US 12,407,190 B2
(45) Date of Patent: Sep. 2, 2025

(54) POWER-RECEIVING-MODULE-TYPE TELEMETER TRANSMITTER, TELEMETER MEASURING SYSTEM, ROTARY MACHINE, AND TELEMETER TRANSMISSION METHOD

(71) Applicant: MITSUBISHI HEAVY INDUSTRIES, LTD., Tokyo (JP)

(72) Inventors: Kenji Iizuka, Tokyo (JP); Keiichi Morishita, Tokyo (JP); Naoki Oyama, Tokyo (JP); Jun Yasui, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 485 days.

(21) Appl. No.: 17/909,856

(22) PCT Filed: Mar. 24, 2021

(86) PCT No.: PCT/JP2021/012279
§ 371 (c)(1),
(2) Date: Sep. 7, 2022

(87) PCT Pub. No.: WO2021/193730
PCT Pub. Date: Sep. 30, 2021

(65) Prior Publication Data
US 2023/0110092 A1    Apr. 13, 2023

(30) Foreign Application Priority Data
Mar. 27, 2020    (JP) .................................. 2020-058245

(51) Int. Cl.
*H02J 50/20*    (2016.01)
*F01D 21/00*    (2006.01)
(Continued)

(52) U.S. Cl.
CPC ............ *H02J 50/20* (2016.02); *F01D 21/003* (2013.01); *F02C 7/00* (2013.01); *G08C 17/02* (2013.01); *H02J 50/402* (2020.01)

(58) Field of Classification Search
CPC .......... H02J 50/20; H02J 50/402; H02J 50/40; F01D 21/003; F01D 17/06; F01D 17/02;
(Continued)

(56) References Cited

U.S. PATENT DOCUMENTS

| | | | |
|---|---|---|---|
| 6,845,089 B1 * | 1/2005 | Gu | H04L 1/16 |
| | | | 455/515 |
| 2005/0018795 A1 * | 1/2005 | Studenny | G06F 11/1487 |
| | | | 375/343 |

(Continued)

FOREIGN PATENT DOCUMENTS

| | | | |
|---|---|---|---|
| JP | H10-172844 A | | 6/1998 |
| JP | 2005312285 A | * | 11/2005 |

(Continued)

OTHER PUBLICATIONS

International Search Report issued in corresponding International Application No. PCT/JP2021/012279, mailed May 25, 2021 (4 pages).

(Continued)

*Primary Examiner* — Amine Benlagsir
(74) *Attorney, Agent, or Firm* — Osha Bergman Watanabe & Burton LLP

(57) ABSTRACT

A power-receiving-module-type telemeter transmitter of a telemeter measuring system that is provided in a rotor and that performs communication using power received from a power transmitting antenna formed in an arc shape on a stator side, includes: a plurality of power receiving modules disposed in the rotor at intervals in a circumferential direction; an OR circuit that outputs a highest voltage among (Continued)

voltages input from the plurality of power receiving modules; a sensor that measures a state of a monitoring target and that outputs measurement data indicating the state; and a transmitting unit that is driven by the voltage input from the OR circuit as a power source and that transmits a radio signal including the measurement data of the sensor.

8 Claims, 11 Drawing Sheets

(51) Int. Cl.
  *F02C 7/00* (2006.01)
  *G08C 17/02* (2006.01)
  *H02J 50/40* (2016.01)
(58) Field of Classification Search
  CPC ....... F02C 7/00; G08C 17/02; H04Q 2209/40; H04Q 2209/88; H04Q 9/00; H03K 19/20
  See application file for complete search history.

(56) References Cited

U.S. PATENT DOCUMENTS

2005/0057359 A1\* 3/2005 Coffey ............... G08B 21/0202
  340/539.21
2019/0181689 A1 6/2019 Oyama et al.

FOREIGN PATENT DOCUMENTS

| JP | 2008-092703 A | | 4/2008 | |
|----|---------------|---|--------|---|
| JP | 2010172844 A | \* | 8/2010 | ......... B01D 46/0068 |
| JP | 2012139051 A | \* | 7/2012 | |
| JP | 2018170893 A | \* | 11/2018 | ............. F01D 25/00 |

OTHER PUBLICATIONS

Written Opinion issued in corresponding International Application No. PCT/JP2021/012279, mailed May 25, 2021 (8 pages).

\* cited by examiner

FIG. 10

| COMMUNICATION RESULT | | | STATE OF POWER RECEIVING MODULE | | | STATE OF TRANSMITTING UNIT | | |
| --- | --- | --- | --- | --- | --- | --- | --- | --- |
| 114A | 114B | 114C | 111A | 111B | 111C | 114A | 114B | 114C |
| SUCCEEDED FOR ENTIRETY | SUCCEEDED FOR ENTIRETY | SUCCEEDED FOR ENTIRETY | NORMAL | NORMAL | NORMAL | NORMAL | NORMAL | NORMAL |
| SUCCEEDED FOR ENTIRETY | SUCCEEDED FOR ENTIRETY | FAILED FOR PART | NORMAL | NORMAL | NORMAL | NORMAL | NORMAL | POSSIBILITY OF MALFUNCTION |
| SUCCEEDED FOR ENTIRETY | FAILED FOR PART | SUCCEEDED FOR ENTIRETY | NORMAL | NORMAL | NORMAL | NORMAL | POSSIBILITY OF MALFUNCTION | NORMAL |
| SUCCEEDED FOR ENTIRETY | FAILED FOR PART | FAILED FOR PART | NORMAL | NORMAL | MALFUNCTION | NORMAL | POSSIBILITY OF MALFUNCTION | POSSIBILITY OF MALFUNCTION |
| FAILED FOR PART | SUCCEEDED FOR ENTIRETY | SUCCEEDED FOR ENTIRETY | NORMAL | MALFUNCTION | NORMAL | POSSIBILITY OF MALFUNCTION | NORMAL | NORMAL |
| FAILED FOR PART | SUCCEEDED FOR ENTIRETY | FAILED FOR PART | MALFUNCTION | NORMAL | NORMAL | POSSIBILITY OF MALFUNCTION | NORMAL | POSSIBILITY OF MALFUNCTION |
| FAILED FOR PART | FAILED FOR PART | SUCCEEDED FOR ENTIRETY | POSSIBILITY OF MALFUNCTION | POSSIBILITY OF MALFUNCTION | POSSIBILITY OF MALFUNCTION | POSSIBILITY OF MALFUNCTION | POSSIBILITY OF MALFUNCTION | NORMAL |
| FAILED FOR PART | FAILED FOR PART | FAILED FOR PART | NORMAL | NORMAL | NORMAL | POSSIBILITY OF MALFUNCTION | POSSIBILITY OF MALFUNCTION | POSSIBILITY OF MALFUNCTION |
| SUCCEEDED FOR ENTIRETY | SUCCEEDED FOR ENTIRETY | FAILED FOR ENTIRETY | NORMAL | NORMAL | NORMAL | NORMAL | NORMAL | MALFUNCTION |
| SUCCEEDED FOR ENTIRETY | FAILED FOR ENTIRETY | SUCCEEDED FOR ENTIRETY | NORMAL | NORMAL | POSSIBILITY OF MALFUNCTION | NORMAL | MALFUNCTION | NORMAL |
| SUCCEEDED FOR ENTIRETY | FAILED FOR ENTIRETY | FAILED FOR ENTIRETY | NORMAL | NORMAL | NORMAL | NORMAL | MALFUNCTION | MALFUNCTION |
| FAILED FOR ENTIRETY | SUCCEEDED FOR ENTIRETY | SUCCEEDED FOR ENTIRETY | NORMAL | POSSIBILITY OF MALFUNCTION | NORMAL | MALFUNCTION | NORMAL | NORMAL |
| FAILED FOR ENTIRETY | SUCCEEDED FOR ENTIRETY | FAILED FOR ENTIRETY | NORMAL | NORMAL | NORMAL | MALFUNCTION | NORMAL | MALFUNCTION |
| FAILED FOR ENTIRETY | FAILED FOR ENTIRETY | SUCCEEDED FOR ENTIRETY | POSSIBILITY OF MALFUNCTION | NORMAL | NORMAL | MALFUNCTION | MALFUNCTION | NORMAL |
| FAILED FOR ENTIRETY | FAILED FOR ENTIRETY | FAILED FOR ENTIRETY | POSSIBILITY OF MALFUNCTION | POSSIBILITY OF MALFUNCTION | POSSIBILITY OF MALFUNCTION | POSSIBILITY OF MALFUNCTION | POSSIBILITY OF MALFUNCTION | POSSIBILITY OF MALFUNCTION |

POWER-RECEIVING-MODULE-TYPE TELEMETER TRANSMITTER, TELEMETER MEASURING SYSTEM, ROTARY MACHINE, AND TELEMETER TRANSMISSION METHOD

TECHNICAL FIELD

The present disclosure relates to a power-receiving-module-type telemeter transmitter, a telemeter measuring system, a rotary machine, and a telemeter transmission method.

Priority is claimed on Japanese Patent Application No. 2020-058245 filed on Mar. 27, 2020, the content of which is incorporated herein by reference.

BACKGROUND ART

A telemeter measuring system is known as an operation monitoring system for monitoring the operation state of a rotary machine such as a gas turbine. PTL 1 discloses a telemeter measuring system that supplies microwave energy (high-frequency radio waves) to a power receiving module of a measurement signal transmitting device provided in a rotor via an annular power transmitting antenna provided in a stator of a turbine.

CITATION LIST

Patent Literature

[PTL 1] Japanese Unexamined Patent Application Publication No. 2018-170893

SUMMARY OF INVENTION

Technical Problem

Radio waves radiated from a power transmitting antenna provided in a rotary machine are reflected, refracted, or scattered by a structure such as a stator provided in the rotary machine. Therefore, in radio wave propagation, multipath occurs in which a plurality of propagation paths exist between the power transmitting antenna on a stator side and a power receiving antenna on a rotor side. When multipath occurs, there is a possibility of fading in which the reception level of radio waves fluctuates due to phase synthesis of a direct wave and a reflected wave in the power receiving antenna. Therefore, there is a possibility that the power supplied from the power transmitting antenna also fluctuates depending on the power receiving location.

An object of the present invention is to provide a power-receiving-module-type telemeter transmitter, a telemeter measuring system, a rotary machine, and a telemeter transmission method capable of stably receiving power from a power transmitting antenna.

Solution to Problem

A power-receiving-module-type telemeter transmitter according to the present disclosure is a power-receiving-module-type telemeter transmitter of a telemeter measuring system that is provided in a rotor and that performs communication using power received from a power transmitting antenna formed in an arc shape on a stator side covering the rotor, the power-receiving-module-type telemeter transmitter including: a plurality of power receiving modules disposed in the rotor at intervals in a circumferential direction; an OR circuit that outputs a highest voltage among voltages input from the plurality of power receiving modules; a sensor that measures a state of the rotor and that outputs measurement data indicating the state; and a transmitting unit that is driven by the voltage input from the OR circuit as a power source and that transmits a radio signal including the measurement data of the sensor.

A telemeter measuring system according to the present disclosure includes: the power-receiving-module-type telemeter transmitter according to the above aspect; the power transmitting antenna provided in a stator and formed in an arc shape; an oscillator that supplies a high-frequency signal to the power transmitting antenna; a receiving antenna provided in the stator and formed in an arc shape; and a receiving unit that receives the radio signal from the power-receiving-module-type telemeter transmitter via the receiving antenna.

A rotary machine according to the present disclosure includes: a stator; a rotor that has a rotating shaft rotating about an axis with respect to the stator, and a plurality of rotor blades that are provided so as to radially extend from an outer peripheral surface of the rotating shaft; and the telemeter measuring system according to the above aspect, in which the sensor is provided in each of the rotor blades.

A telemeter transmission method according to the present disclosure is a telemeter transmission method, in which a power-receiving-module-type telemeter transmitter of a telemeter measuring system that is provided in a rotor and that performs communication using power received from a power transmitting antenna formed in an arc shape on a stator side is used, the power-receiving-module-type telemeter transmitter including a plurality of power receiving modules disposed in the rotor at intervals in a circumferential direction, a sensor that measures a state of a monitoring target and that outputs measurement data indicating the state, and a transmitting unit that transmits a radio signal including the measurement data of the sensor, the telemeter transmission method including: a step of receiving power from the power transmitting antenna via the plurality of power receiving modules; a step of driving the transmitting unit using a highest voltage among voltages input from the plurality of power receiving modules as a power source; and a step of transmitting the radio signal including the measurement data of the sensor via the transmitting unit.

Advantageous Effects of Invention

According to the power-receiving-module-type telemeter transmitter according to the present disclosure, power can be stably received from an annular power transmitting antenna.

BRIEF DESCRIPTION OF DRAWINGS

FIG. 10 is a diagram showing the relationship between the success or failure of communication and a malfunction state according to at least one embodiment.

DESCRIPTION OF EMBODIMENTS

First Embodiment (Configuration of Gas Turbine (Rotary Machine))

Hereinafter, embodiments will be described in detail with reference to the drawings.

Figure 1:
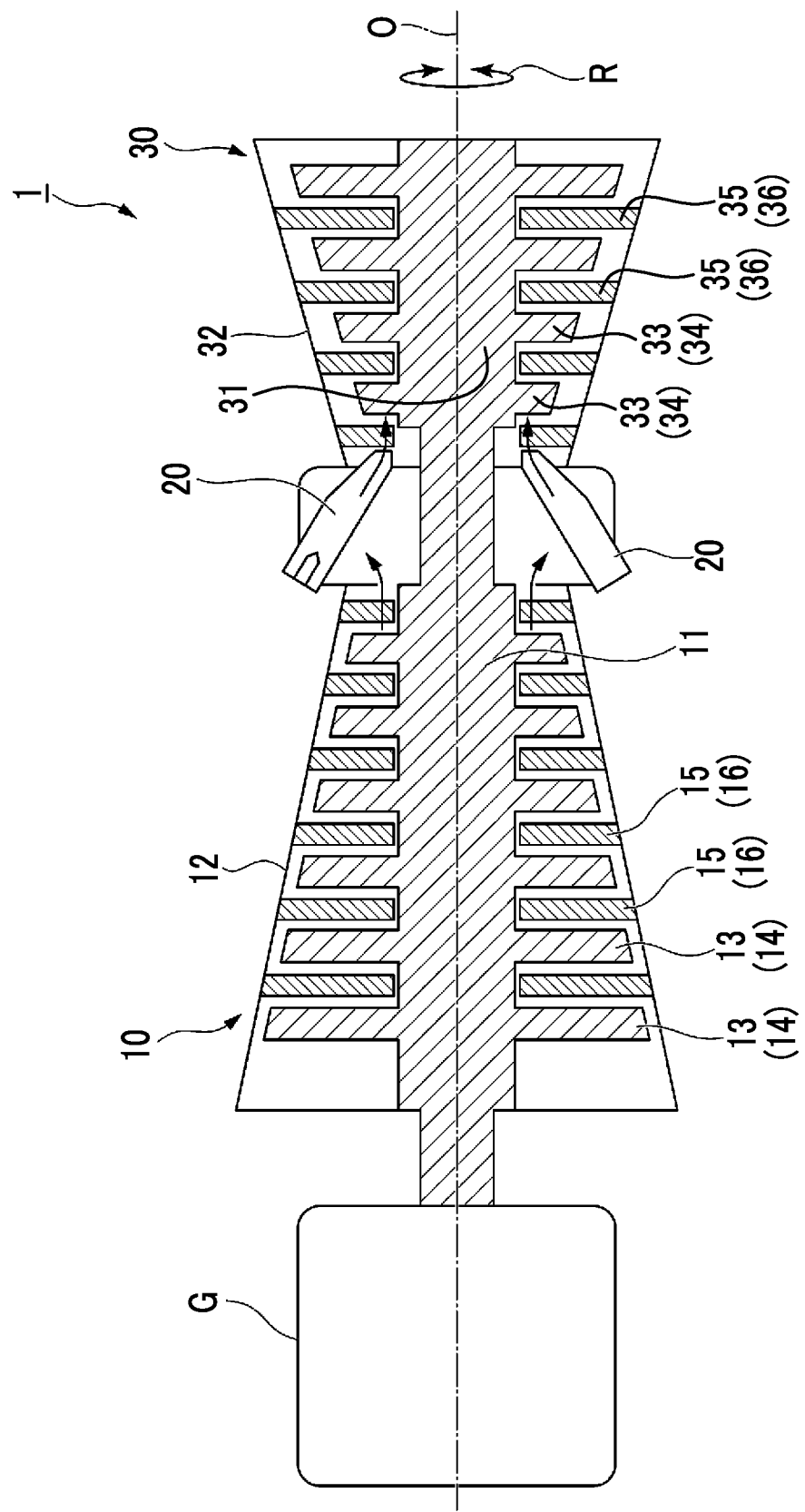
FIG. 1 is a schematic longitudinal sectional view of a gas turbine according to at least one embodiment.

FIG. 1 is a schematic longitudinal sectional view of a gas turbine 1 according to a first embodiment.

As shown in FIG. 1, the gas turbine 1 according to the first embodiment includes a compressor 10, a combustor 20, and a turbine 30. The compressor 10 rotates to generate high-pressure air. The combustor 20 mixes fuel with the high-pressure air generated by the compressor 10 and burns the fuel to produce combustion gas. The turbine 30 is driven by the combustion gas generated by the combustor 20. The gas turbine 1 is an example of a rotary machine.

The compressor 10 has a compressor rotor 11 that rotates around an axis O, and a compressor casing 12 that covers the compressor rotor 11 from an outer peripheral side. The compressor rotor 11 has a columnar shape extending along the axis O. On an outer peripheral surface of the compressor rotor 11, a plurality of compressor rotor blade stages 13 arranged at intervals in the axis O direction are provided. Each compressor rotor blade stage 13 has a plurality of compressor rotor blades 14 arranged at intervals in a circumferential direction of the axis O on the outer peripheral surface of the compressor rotor 11.

The compressor casing 12 has a tubular shape centered on the axis O. On an inner peripheral surface of the compressor casing 12, a plurality of compressor stator vane stages 15 arranged at intervals in the axis O direction are provided. These compressor stator vane stages 15 are alternately arranged with respect to the compressor rotor blade stages 13 when viewed in the axis O direction. Each compressor stator vane stage 15 has a plurality of compressor stator vanes 16 arranged at intervals in the circumferential direction of the axis O on the inner peripheral surface of the compressor casing 12.

The combustor 20 is provided between the compressor casing 12 and a turbine casing 32, which will be described later. The high-pressure air generated by the compressor 10 is mixed with the fuel inside the combustor 20 to become a premixed gas. In the combustor 20, the premixed gas is burned and high-temperature and high-pressure combustion gas is generated. The combustion gas is guided into the turbine casing 32 to drive the turbine 30.

The turbine 30 has a turbine rotor (rotor) 31 that rotates around the axis O, and the turbine casing 32 that covers the turbine rotor 31 from an outer peripheral side. The turbine rotor 31 has a columnar shape extending along the axis O as a whole with a plurality of disc-shaped turbine discs 31a (see FIG. 2) centered on the axis O and stacked in the axis O direction. A turbine rotor blade stage 33 is provided on an outer periphery of each of the turbine discs 31a. Accordingly, the turbine rotor 31 is provided with a plurality of turbine rotor blade stages 33 arranged at intervals in the axis O direction.

Each turbine rotor blade stage 33 has a plurality of turbine rotor blades (monitoring targets) 34 arranged at intervals in the circumferential direction of the axis O on an outer peripheral surface of the turbine rotor 31. The turbine rotor 31 is integrally connected to the compressor rotor 11 in the axis O direction to form a gas turbine rotor.

The turbine casing 32 has a tubular shape centered on the axis O. On an inner peripheral surface of the turbine casing 32, a plurality of turbine stator vane stages 35 arranged at intervals in the axis O direction are provided. These turbine stator vane stages 35 are alternately arranged with respect to the turbine rotor blade stages 33 when viewed in the axis O direction. Each turbine stator vane stage 35 has a plurality of turbine stator vanes 36 arranged at intervals in the circumferential direction of the axis O on the inner peripheral surface of the turbine casing 32. The turbine casing 32 is connected to the compressor casing 12 in the axis O direction to form a gas turbine casing. That is, the gas turbine rotor can be integrally rotated around the axis O in the gas turbine casing.

(Configuration of Telemeter Measuring System)

Figure 2:
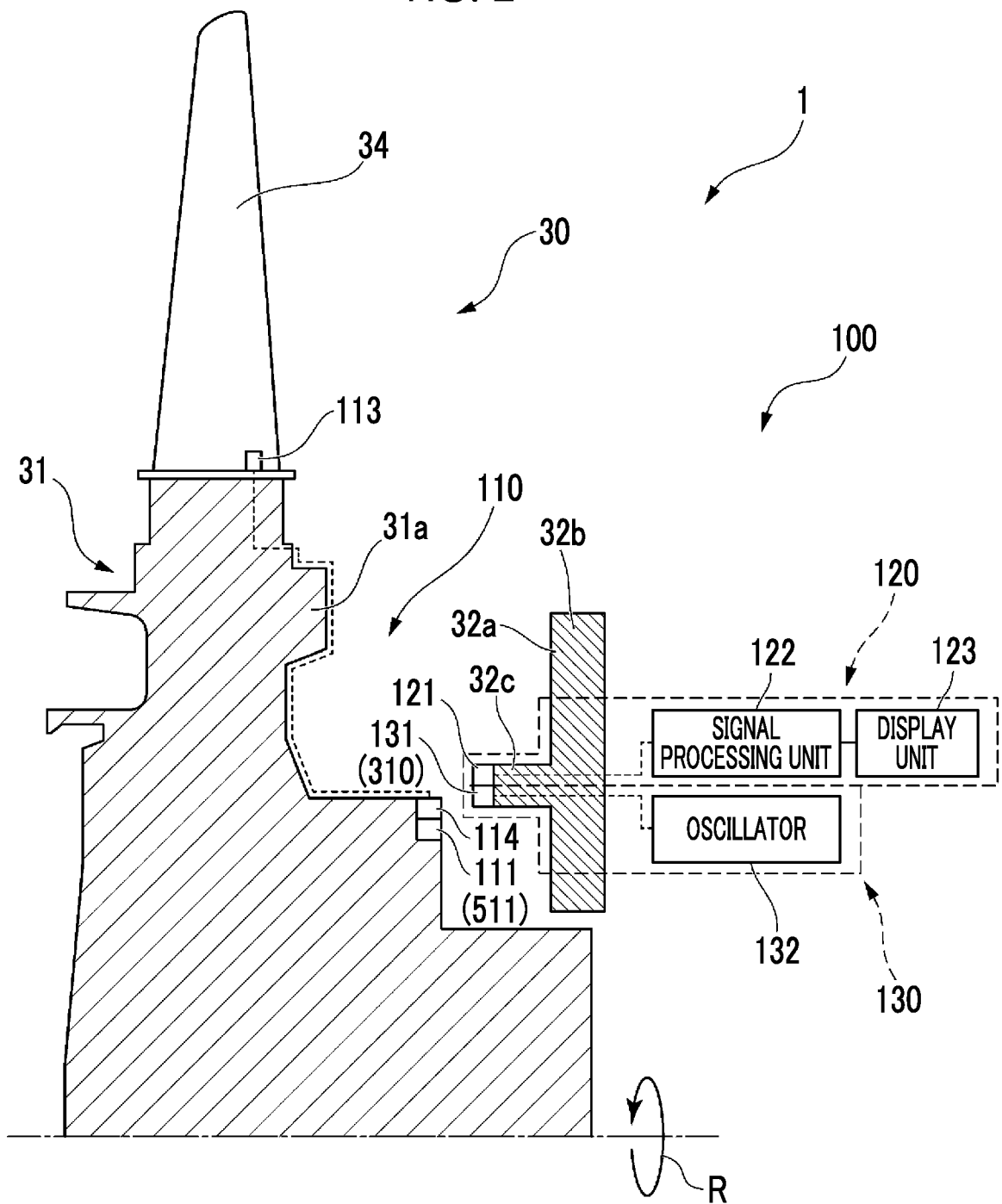
FIG. 2 is a longitudinal sectional view showing a schematic configuration of a telemeter measuring system according to at least one embodiment.
Figure 3:
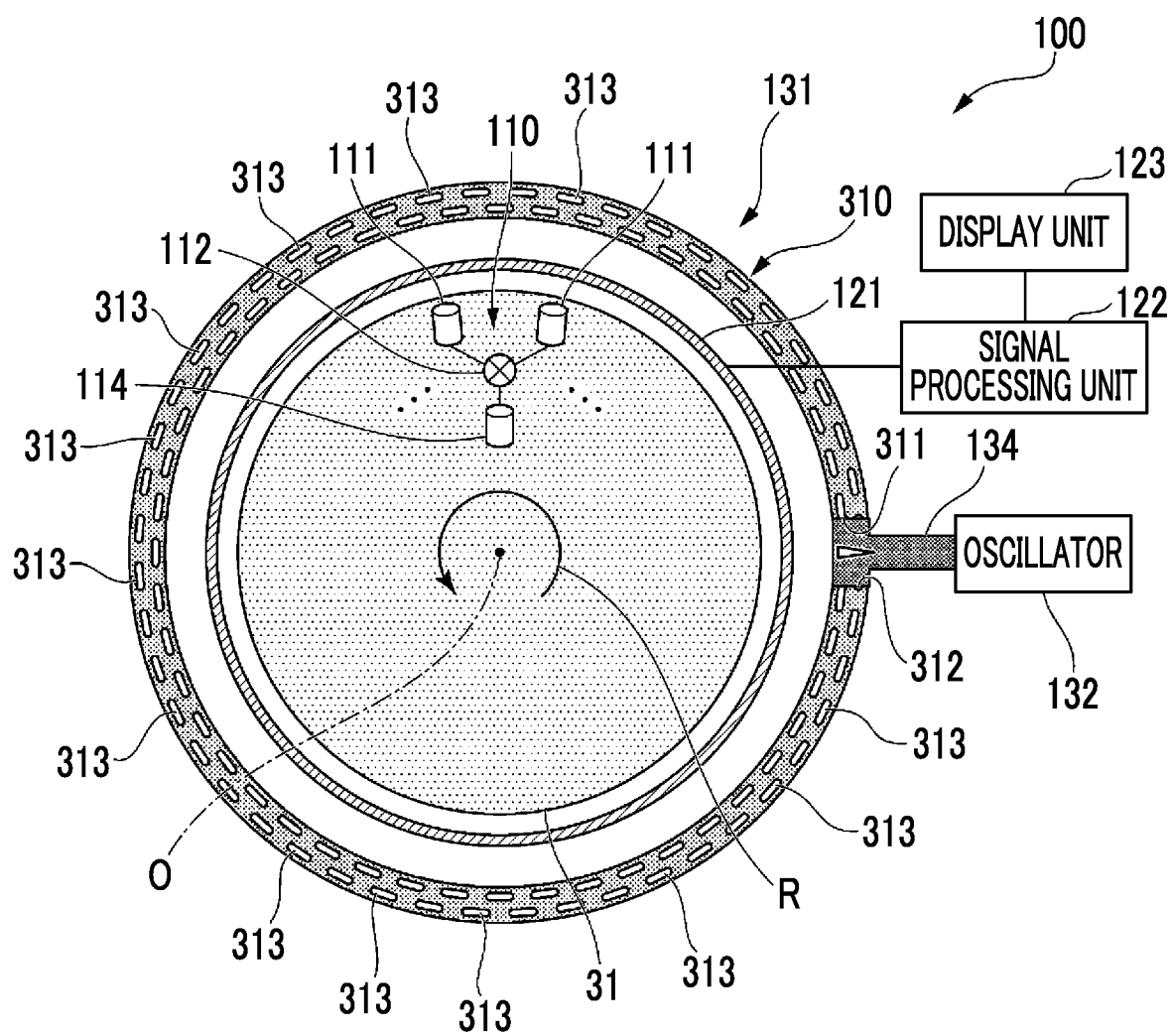
FIG. 3 is a schematic cross-sectional view showing a schematic configuration of the telemeter measuring system according to at least one embodiment.

FIG. 2 is a longitudinal sectional view showing a schematic configuration of a telemeter measuring system 100 according to the first embodiment. FIG. 3 is a schematic cross-sectional view showing a schematic configuration of the telemeter measuring system 100 according to the first embodiment.

The gas turbine 1 according to the first embodiment includes the telemeter measuring system 100 for monitoring an operation state of the gas turbine 1 during an operation, for example, surface temperature, strain, vibration, and the like of turbine blades. As shown in FIG. 2, the telemeter measuring system 100 includes a plurality of power-receiving-module-type telemeter transmitters 110, a receiving device 120, and a power supply device 130.

(Configuration of Power Supply Device)

The power supply device 130 sends (supplies) power to power receiving antennas 511 of the plurality of power-receiving-module-type telemeter transmitters 110 disposed in the turbine rotor 31 at intervals in the circumferential direction from a stationary member 32a side of the gas turbine casing in a non-contact manner. The power supply device 130 has a power transmitting antenna 131 and an oscillator 132. The stationary member 32a is a member that is stationary without rotating relative to the turbine rotor 31 that rotates around the axis O, and is fixed to, for example, the turbine casing 32. The stationary member 32a is not limited to being fixed to the turbine casing 32, and may be attached to another stationary structure. The turbine casing 32 and the stationary member 32a are parts of a stator.

The power transmitting antenna 131 has an annular shape centered on the axis O as a whole. The power transmitting antenna 131 is fixed to the stationary member 32a. In the present embodiment, the power transmitting antenna 131 is formed of a leaky waveguide 310 (leaky antenna).

The leaky waveguide 310 extends in the circumferential direction and along an arc centered on the axis O. The inside of the leaky waveguide 310 is hollow, and the cross-sectional shape thereof orthogonal to an extending direction is, for example, square or circular. In the leaky waveguide 310, a first end portion 311, which is an end portion on one side in the circumferential direction, and a second end portion 312, which is an end portion on the other side in the circumferential direction, are connected via a distributor 134. The distributor 134 is a T-shaped single-input, two-output waveguide, and distributes and outputs radio waves input to an input end to two output ends. The input end of the distributor 134 is connected to the oscillator 132. That is, the leaky waveguide 310 forms an annular shape surrounding the axis o on the entire circumference except for gaps. The distributor 134 may be formed integrally with the leaky waveguide 310. A reflector (not shown) is provided at a position facing the first end portion 311 and the second end portion 312 inside the waveguide so that the power distribution in the entire waveguide is adjusted to be uniform.

The leaky waveguide 310 is fixed to tips of a plurality of projecting sections 32c of the stationary member 32a of the gas turbine casing. That is, the leaky waveguide 310 is fixed by the projecting sections 32c while sequentially passing through the projecting sections 32c disposed at intervals in the circumferential direction. As shown in FIG. 2, the leaky waveguide 310 is located on one side (right side in FIG. 2, downstream side of the turbine) in the axis O direction relative to the power receiving antenna 511 of power receiving modules 111 arranged in an annular shape.

On a surface of the leaky waveguide 310 facing the power receiving antenna 511 side, a plurality of radiation portions 313 which are open to the surface of the leaky waveguide 310 are arranged at intervals.

The oscillator 132 oscillates a high-frequency signal having a predetermined frequency in response to a power supply from a power source (not shown). The oscillator 132 is electrically connected to the distributor 134 of the leaky waveguide 310. The high-frequency signal oscillated by the oscillator 132 is transmitted to the first end portion 311 and the second end portion 312 of the leaky waveguide 310 via the distributor 134, so that electromagnetic waves propagate from the first end portion 311 and the second end portion 312 toward the reflector while forming an electromagnetic field in the leaky waveguide 310. Based on these electromagnetic waves, radio waves (microwaves) are radiated into a space from each of the radiation portions 313.

(Configuration of Power-Receiving-Module-Type Telemeter Transmitter)

The power-receiving-module-type telemeter transmitter 110 is provided integrally with the turbine rotor 31 of the gas turbine 1, and rotates around the axis o as the turbine rotor 31 rotates. The power-receiving-module-type telemeter transmitter 110 is driven by the power transmitted as radio waves (microwaves) from the power supply device 130, and transmits the measurement value of a state quantity related to the gas turbine 1 via a radio signal.

Figure 4:
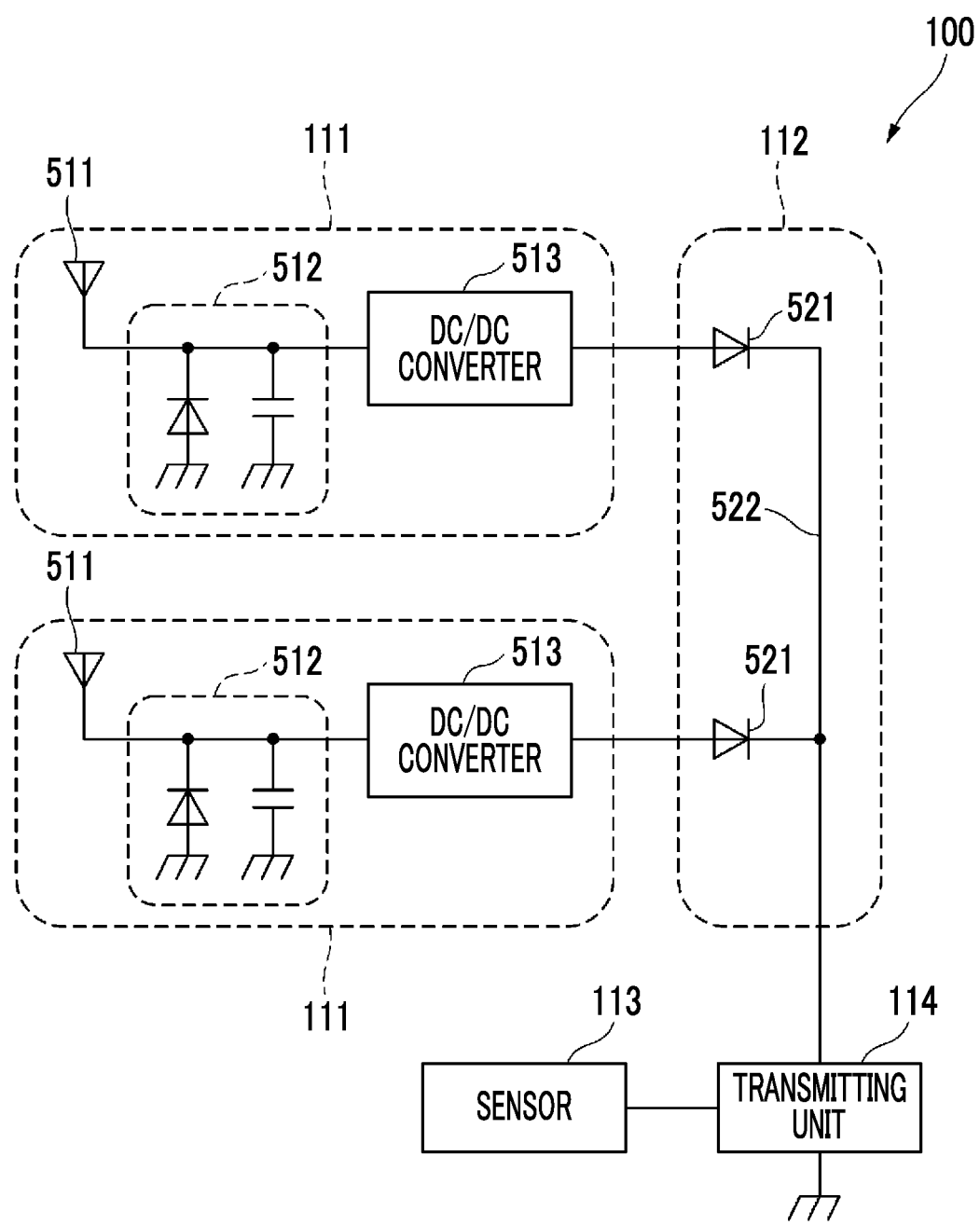
FIG. 4 is a schematic circuit diagram showing a configuration of a power-receiving-module-type telemeter transmitter according to at least one embodiment.

FIG. 4 is a schematic circuit diagram showing the configuration of the power-receiving-module-type telemeter transmitter 110. The power-receiving-module-type telemeter transmitter 110 includes two power receiving modules 111, an OR circuit 112, a sensor 113, and a transmitting unit 114.

The power receiving module 111 receives radio waves supplied from the power supply device 130. Each of the power receiving modules 111 includes the power receiving antenna 511, a detector 512, and a DC/DC converter 513.

The power receiving antennas 511 are provided on the surface of the turbine disc 31a facing one side in the axis O direction at intervals in the circumferential direction so as to be exposed from the outer surface of the turbine disc 31a. The detector 512 converts the microwaves received by the power receiving antenna 511 into a DC signal. For example, the detector 512 is made up of a diode and a capacitor as shown in FIG. 4.

The DC/DC converter 513 converts the DC voltage input from the detector 512 into a predetermined voltage value.

The OR circuit 112 outputs the highest voltage among the voltages output by the two power receiving modules 111. That is, the OR circuit 112 outputs a signal related to the logical sum of the voltage signals output by the two power receiving modules 111.

The OR circuit 112 is, for example, as shown in FIG. 4, a so-called diode OR circuit including two diodes 521 and an output wire 522. Anodes of the two diodes 521 are respectively connected to the corresponding power receiving modules 111. Cathodes of the two diodes 521 are each connected to the output wire 522 in parallel. Accordingly, the highest voltage among the voltages output by the two power receiving modules 111 is output from the output wire 522.

The OR circuit 112 according to another embodiment may include, for example, a transistor such as a field effect transistor (FET) or a switch instead of the diode 521.

The sensor 113 according to the first embodiment is attached to the turbine rotor blade 34. Examples of the sensor 113 include a strain gauge that measures the vibration of the turbine rotor blade 34, a thermocouple that measures the temperature of the turbine rotor blade 34, and a sensor 113 that measures the state quantity of the turbine rotor blade 34 in an operating state of the gas turbine 1.

The transmitting unit 114 is provided on the surface of the turbine disc 31a facing one side in the axis O direction so as to be exposed from the outer surface of the turbine disc 31a. The transmitting unit 114 is electrically connected to the OR circuit 112 and to the sensor 113. The transmitting unit 114 is driven by DC power supplied from the OR circuit 112. A measurement signal from the corresponding sensor 113 is input to the transmitting unit 114. The transmitting unit 114 converts the measurement signal of the sensor 113 into radio information, and transmits the radio information to the outside via a transmitting antenna (not shown).

(Configuration of Receiving Device)

The receiving device 120 includes a receiving antenna 121, a signal processing unit 122, and a display unit 123.

The receiving antenna 121 is provided in the projecting section 32c of the stationary member 32a, and receives the radio information transmitted by the transmitting unit 114 of the power-receiving-module-type telemeter transmitter 110. The receiving antenna 121 is disposed on one side in the axis O direction and outside in the radial direction with respect to the transmitting unit 114. That is, the receiving antenna 121 faces the transmitting unit 114 in a direction inclined with respect to the axis O direction.

The radio signal received by the receiving antenna 121 is demodulated by a receiving unit (not shown) and is converted into a sensor signal. This sensor signal is subjected to AD conversion by the signal processing unit 122, processed into various kinds of data such as temperature, strain, and vibration, and displayed and stored. The signal processing unit 122 is configured by, for example, a computer.

The display unit 123 displays a detection signal of the sensor 113 extracted by the signal processing unit 122 so that a manager of the gas turbine 1, for example, can confirm the detection signal. The signal processing unit 122 and the display unit 123 may be provided outside the gas turbine 1.

Actions and Effects

The power-receiving-module-type telemeter transmitter 110 of the telemeter measuring system 100 according to the first embodiment includes a plurality of the power receiving antennas 511 and the OR circuit 112 that outputs the highest voltage among the voltages input from the plurality of the power receiving antennas 511, and the transmitting unit 114 is driven by the output voltage of the OR circuit 112 as a power source. Accordingly, the power-receiving-module-type telemeter transmitter 110 can stably receive power from the power supply device 130.

Here, the reason why the power-receiving-module-type telemeter transmitter 110 according to the first embodiment can stably receive power from the power supply device 130 will be described.

Causes of hindrance to stable power reception in the power-receiving-module-type telemeter transmitter 110 include multipath fading that occurs when radio waves propagate between the power supply device 130 and the power-receiving-module-type telemeter transmitter 110. Since the power supply device 130 continuously outputs radio waves, fading occurs randomly, and there is no correlation between the rotation position of the power receiving antenna 511 of the power-receiving-module-type telemeter transmitter 110 and the fluctuation of the amount of received power.

Figure 5:
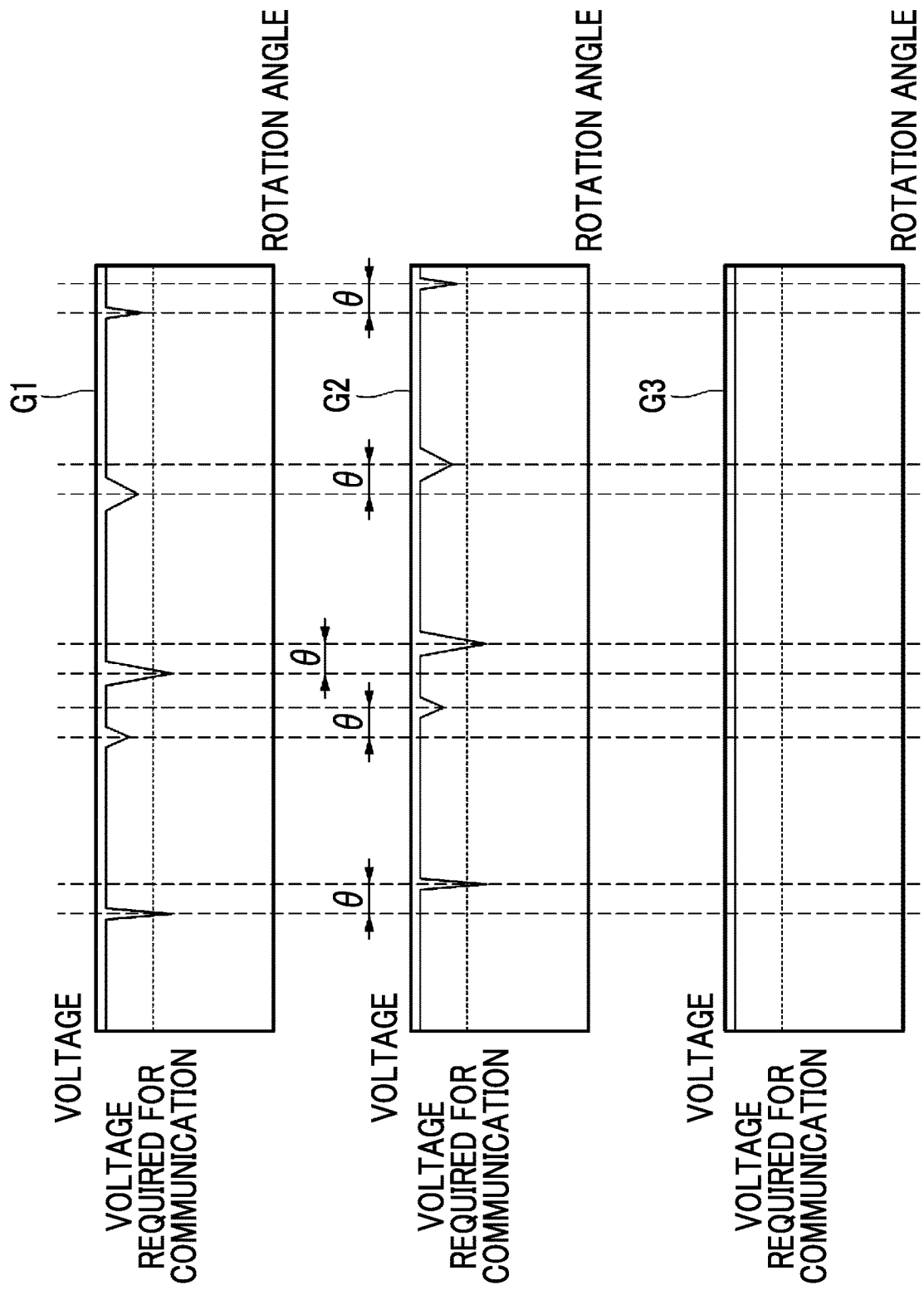
FIG. 5 is a diagram showing an example of the relationship between the rotation position of a rotor according to at least one embodiment, the voltage received by a power receiving module, and the voltage output by an OR circuit.

FIG. 5 is a diagram showing an example of the relationship between the rotation position of the rotor according to the first embodiment, the voltage received and detected by the power receiving module 111, and the voltage output by the OR circuit 112. Graph G1 shows the relationship between the rotation position of the rotor and the voltage received and detected by a first power receiving module 111a. Graph G2 shows the relationship between the rotation position of the rotor and the voltage received and detected by a second power receiving module 111b. Graph G3 shows the relationship between the rotation position of the rotor and the voltage output by the OR circuit 112.

Here, a plurality of the power receiving modules 111 according to the first embodiment are disposed at intervals in the circumferential direction of the rotor. Therefore, the rotation angle at which fading occurs is different in each of the power receiving modules 111. For example, in a case where the first power receiving module 111a is disposed at a position deviated from the second power receiving module 111b by an angle θ with respect to the axis O, as shown in Graphs G1 and G2, the rotation position where fading occurs in the second power receiving module 111b deviates from the rotation position where fading occurs in the first power receiving module 111a by the angle θ. Therefore, when a decrease in the received power is caused by fading in one power receiving module 111, there is a high probability that a decrease in the received power due to fading in the other power receiving module 111 does not occur. Therefore, by taking the logical sum of the detection outputs of the signals received by the plurality of power receiving modules 111 arranged at intervals in the circumferential direction as described above, as shown in Graph G3, it can be expected that outputting a voltage at which a decrease in the received power due to fading at any rotation position does not occur is achieved. That is, the power-receiving-module-type telemeter transmitter 110 can be stably supplied with power by using the highest voltage among the voltages detected by the plurality of power receiving modules 111 and reducing the influence of power fluctuation due to fading.

In order to achieve stable power supply in consideration of the influence of fading, it is necessary for the power supply device 130 to output a power having a margin to compensate for the decrease in power due to fading. In this case, the scale of the power source facility that supplies power to the power supply device 130 will increase. Contrary to this, according to the power-receiving-module-type telemeter transmitter 110 according to the first embodiment, the influence of power fluctuation is reduced, so that an increase in the scale of the power source facility that supplies power to the power supply device 130 can be suppressed.

The OR circuit 112 of the power-receiving-module-type telemeter transmitter 110 according to the first embodiment is the diode OR circuit made up of a combination of a plurality of the diodes 521. That is, the plurality of power receiving modules 111 of the power-receiving-module-type telemeter transmitter 110 according to the first embodiment are connected via the diodes 521. Therefore, in the power-receiving-module-type telemeter transmitter 110 according to the first embodiment, it is possible to prevent a current from flowing back to the power receiving module 111 side. In a case where the plurality of power receiving modules 111 are connected without the diodes 521, there is a possibility that the current flows back from the power receiving module 111 having a large output to the power receiving module 111 having a small output, and the power receiving module 111 is damaged.

Regarding the power-receiving-module-type telemeter transmitter 110 according to the first embodiment, the configuration of the power-receiving-module-type telemeter transmitter 110 according to the first embodiment can be easily implemented by adding the power receiving module 111 and the OR circuit 112 to an existing power-receiving-module-type telemeter transmitter according to PTL 1 or the like without replacing the power-receiving-module-type telemeter transmitter.

Second Embodiment

Hereinafter, the telemeter measuring system 100 according to a second embodiment will be described.

The telemeter measuring system 100 according to the second embodiment is different from the first embodiment in the configuration of the power-receiving-module-type telemeter transmitter 110.

(Configuration of Power-Receiving-Module-Type Telemeter Transmitter)

Figure 6:
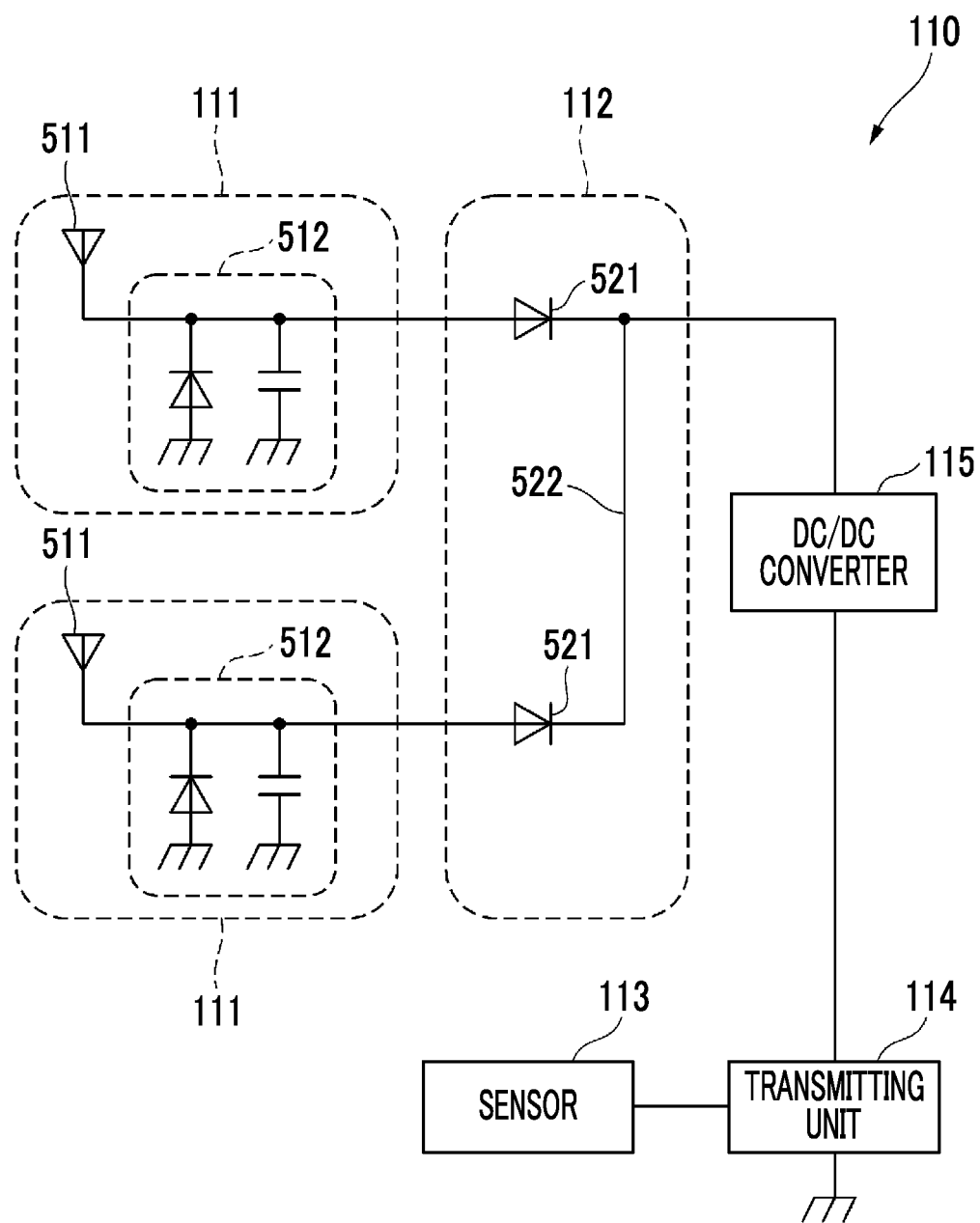
FIG. 6 is a schematic circuit diagram showing a configuration of the power-receiving-module-type telemeter transmitter according to at least one embodiment.

FIG. 6 is a schematic circuit diagram showing the configuration of the power-receiving-module-type telemeter transmitter 110 according to the second embodiment.

The power-receiving-module-type telemeter transmitter 110 according to the second embodiment is different in the disposition of the DC/DC converter from the first embodiment. In the power-receiving-module-type telemeter transmitter 110 according to the first embodiment, the DC/DC converter 513 is provided in the subsequent stage of the detector 512 of each of the power receiving modules 111. Contrary to this, in the power-receiving-module-type telemeter transmitter 110 according to the second embodiment, a DC/DC converter 115 is provided between the OR circuit 112 and the transmitting unit 114.

That is, the OR circuit 112 is supplied with the voltage output by the detector 512 of each of the power receiving modules 111. Then, the DC/DC converter 115 converts the voltage output by the OR circuit 112 into a predetermined voltage value.

Actions and Effects

The power-receiving-module-type telemeter transmitter 110 of the telemeter measuring system 100 according to the second embodiment converts the voltage output via the diode 521 into a predetermined voltage value via the DC/DC converter 115 and uses the voltage as a power source.

Here, the power-receiving-module-type telemeter transmitter 110 according to the first embodiment inputs the voltage converted by the DC/DC converter 115 to the OR circuit 112 including the diode 521. It is known that when a voltage is supplied in a forward direction of the diode 521, a constant voltage drop occurs. Therefore, the voltage supplied to the transmitting unit 114 of the power-receiving-module-type telemeter transmitter 110 according to the first embodiment is a voltage dropped from the output of the DC/DC converter 513.

Contrary to this, in the power-receiving-module-type telemeter transmitter 110 according to the second embodiment, the voltage output via the diode 521 is converted by the DC/DC converter 115. Therefore, a voltage without a voltage drop in the diode 521 can be supplied to the transmitting unit 114 as a power source. That is, the power-receiving-module-type telemeter transmitter 110 according to the second embodiment can improve the power source margin by the voltage drop in the diode 521.

Even in a case where the voltage is converted in the subsequent stage of the OR circuit 112 as in the second embodiment, the power-receiving-module-type telemeter transmitter 110 uses the highest voltage among the voltages received by the plurality of power receiving antennas 511 and detected by the detector 512. Therefore, as in the first embodiment, the influence of power fluctuation due to fading can be reduced, and stable power supply can be achieved.

Third Embodiment

Hereinafter, the telemeter measuring system 100 according to a third embodiment will be described.

The telemeter measuring system 100 according to the third embodiment is different from the first embodiment in the configuration of the power-receiving-module-type telemeter transmitter 110. The signal processing unit 122 according to the third embodiment determines whether or not the power-receiving-module-type telemeter transmitter 110 has malfunctioned based on a received signal.

(Configuration of Power-Receiving-Module-Type Telemeter Transmitter)

Figure 7:
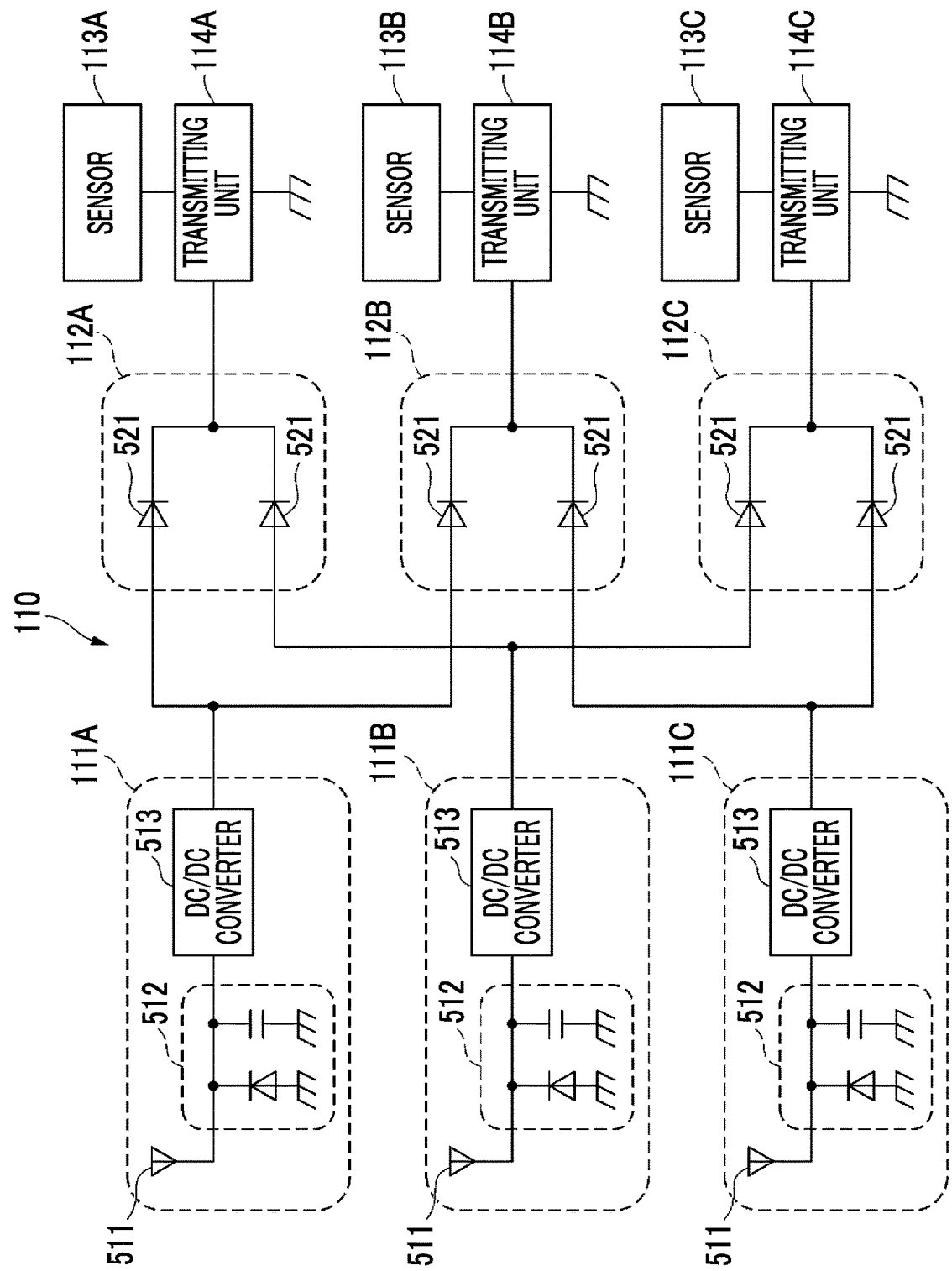
FIG. 7 is a schematic circuit diagram showing a configuration of the power-receiving-module-type telemeter transmitter according to at least one embodiment.

FIG. 7 is a schematic circuit diagram showing the configuration of the power-receiving-module-type telemeter transmitter 110 according to the third embodiment.

The power-receiving-module-type telemeter transmitter 110 according to the third embodiment includes three power receiving modules 111, three OR circuits 112, three sensors 113, and three transmitting units 114.

That is, the power-receiving-module-type telemeter transmitter 110 includes a power receiving module 111A, a power receiving module 111B, a power receiving module 111C, an OR circuit 112A, an OR circuit 112B, an OR circuit 112C, a sensor 113A, a sensor 113B, a sensor 113C, a transmitting unit 114A, a transmitting unit 114B, and a transmitting unit 114C.

The three power receiving modules 111 according to the third embodiment are connected to some of the three OR circuits 112. That is, not all the three OR circuits 112 are connected to one power receiving module 111. The three OR circuits 112 are connected to two power receiving modules 111 of the three power receiving modules 111.

Specifically, the power receiving module 111A is connected to the OR circuit 112A and the OR circuit 112B. The power receiving module 111B is connected to the OR circuit 112A and the OR circuit 112C. The power receiving module 111C is connected to the OR circuit 112B and the OR circuit 112C.

The three transmitting units 114 are driven by a voltage input from the corresponding OR circuit 112 as a power source. Specifically, the transmitting unit 114A is driven by a voltage input from the OR circuit 112A. The transmitting unit 114B is driven by a voltage input from the OR circuit 112B. The transmitting unit 114C is driven by a voltage input from the OR circuit 112C.

The three transmitting units 114 transmit measurement signals of the sensors 113 respectively corresponding to the transmitting unit 114. Specifically, the transmitting unit 114A transmits the measurement signal of the sensor 113A. The transmitting unit 114B transmits the measurement signal of the sensor 113B. The transmitting unit 114C transmits the measurement signal of the sensor 113C.

With the power-receiving-module-type telemeter transmitter 110 configured as described above, it is possible to determine malfunction of the power receiving module 111 or of the transmitting unit 114 based on the received signal by the receiving device 120.

(Operation of Receiving Device)

Figure 8:
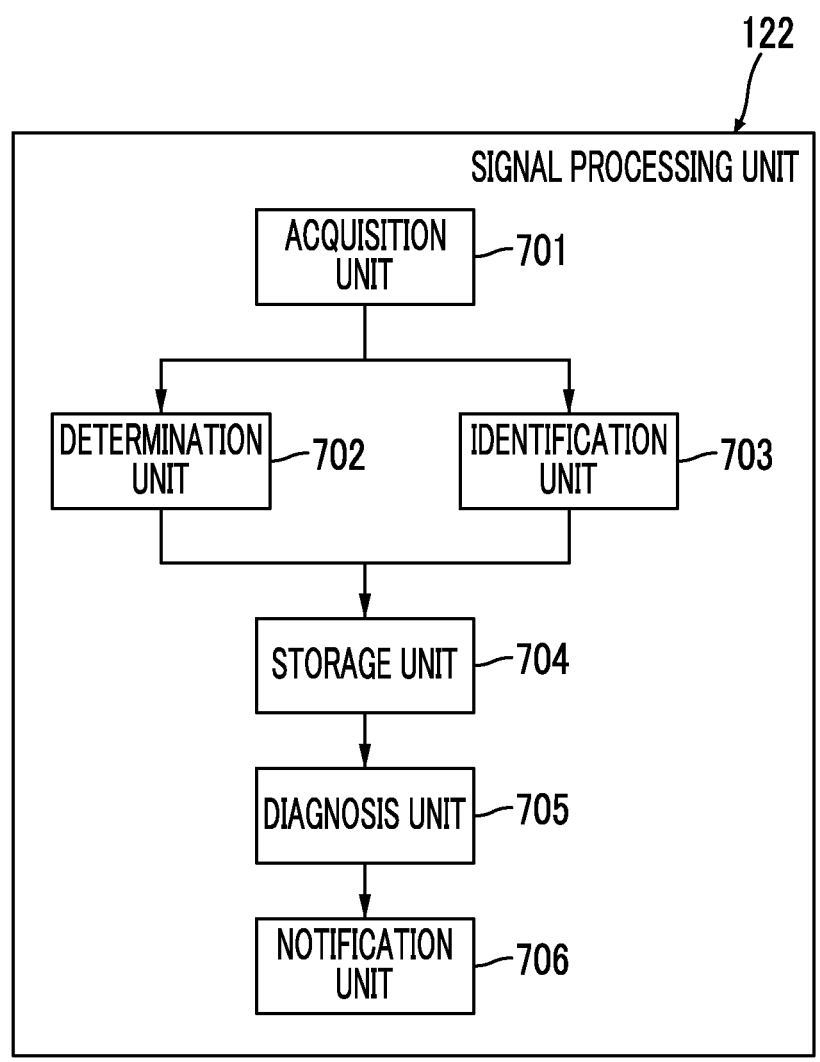
FIG. 8 is a schematic block diagram showing a configuration of a signal processing unit according to at least one embodiment.

FIG. 8 is a schematic block diagram showing the configuration of the signal processing unit 122 according to the third embodiment.

The signal processing unit 122 of the receiving device 120 according to the third embodiment includes an acquisition unit 701, a determination unit 702, an identification unit 703, a storage unit 704, a diagnosis unit 705, and a notification unit 706.

The acquisition unit 701 acquires a measurement signal received by the receiving antenna 121 and demodulated by the receiving unit (not shown).

The determination unit 702 determines whether or not the measurement signal acquired by the acquisition unit 701 can be normally received. The determination unit 702 determines that reception has failed in a case where the measurement signal is not acquired from any of the plurality of power-receiving-module-type telemeter transmitters 110, or in a case where the measurement signal is received but a true value cannot be identified due to a large amount of noise.

The identification unit 703 identifies the power-receiving-module-type telemeter transmitter 110 that is the transmission source of the measurement signal acquired by the acquisition unit 701.

The storage unit 704 stores a frequency channel of the power-receiving-module-type telemeter transmitter 110 in association with a flag indicating whether or not the measurement signal is normally received.

The diagnosis unit 705 diagnoses the possibility of the malfunction of the power-receiving-module-type telemeter transmitter 110 based on the data stored in the storage unit 704.

The notification unit 706 notifies of a diagnosis result by transmitting information for displaying the diagnosis result by the diagnosis unit 705 to the display unit 123.

(Malfunction Diagnosis Method)

Figure 9:
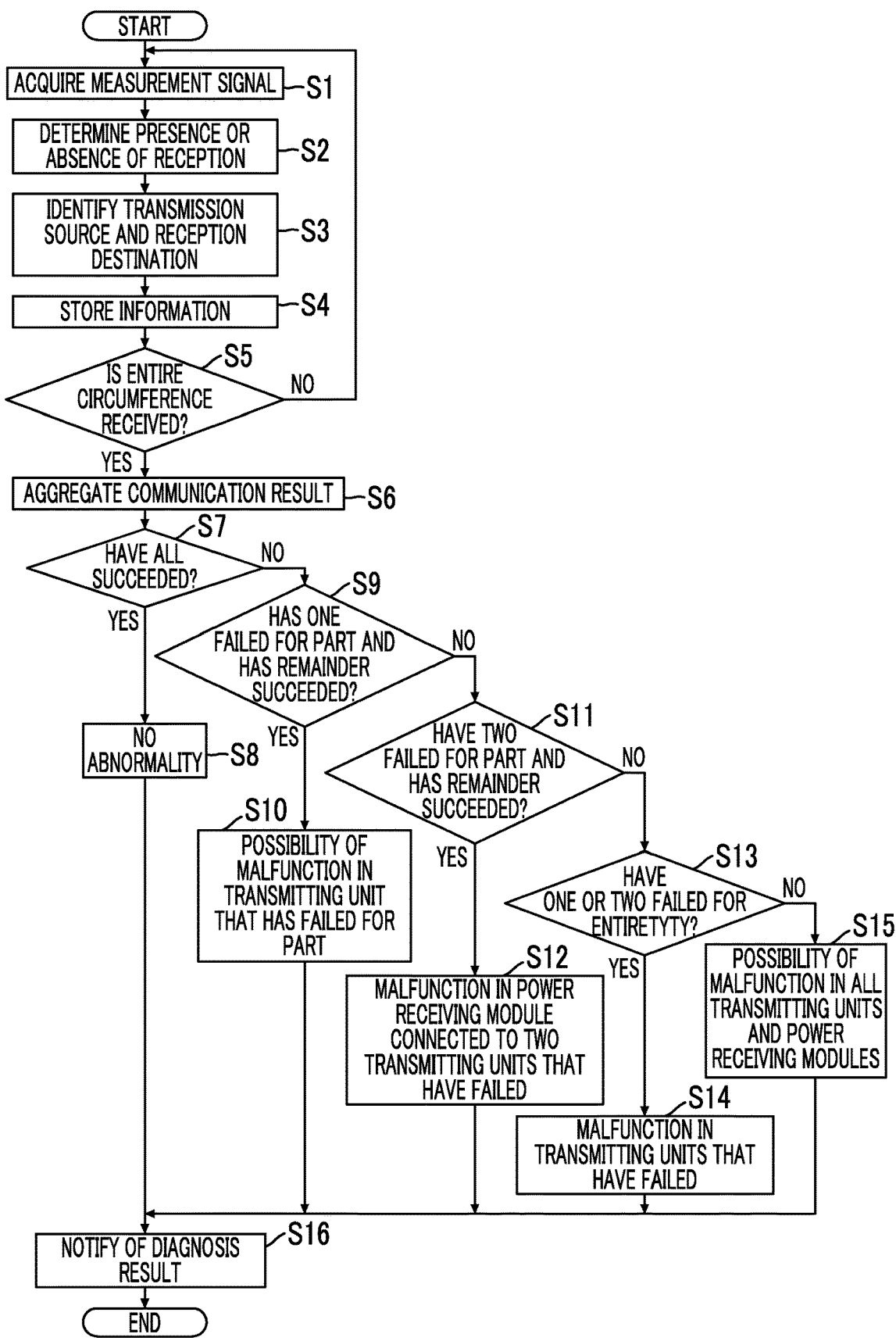
FIG. 9 is a flowchart showing a malfunction diagnosis method of the power-receiving-module-type telemeter transmitter by the signal processing unit according to at least one embodiment.

FIG. 9 is a flowchart showing a malfunction diagnosis method of the power-receiving-module-type telemeter transmitter 110 by the signal processing unit 122 according to the third embodiment. The malfunction diagnosis is performed while the gas turbine 1 is being driven.

The acquisition unit 701 acquires the measurement signal received by the receiving unit from each of the transmitting units 114 of the power-receiving-module-type telemeter transmitter 110 (step S1). Here, the measurement signals from the transmitting unit 114A, the transmitting unit 114B, and the transmitting unit 114C are received.

Next, the determination unit 702 determines whether or not each of the acquired measurement signals has been normally received (step S2). In addition, the identification unit 703 identifies the transmitting unit 114 that is the transmission source of each measurement signal (step S3). The storage unit 704 stores the information of the transmitting unit 114 that is the transmission source identified in step S3 for each measurement signal in association with the flag indicating the success or failure of the reception (step S4).

Next, the diagnosis unit 705 determines whether or not the receiving unit has received the measurement signals for the entire circumference of the stator for each of the transmitting units 114 (step S5). For example, the diagnosis unit 705 determines whether or not the measurement signals of all the transmitting units 114 have been received, with reference to the storage unit 704.

In a case where not all the measurement signals for the entire circumference have been received (NO in step S5), the receiving device 120 returns the process to step S1 and continues to acquire the measurement signals.

On the other hand, in a case where the measurement signals for the entire circumference have been received (YES in step S5), the diagnosis unit 705 aggregates communication results of each of the transmitting units 114, and identifies whether the communication has succeeded for the entire circumference, partially failed, or entirely failed for each of the transmitting units 114 (step S6).

FIG. 10 is a diagram showing the relationship between the success or failure of communication and the malfunction state according to the third embodiment. Hereinafter, the diagnosis unit 705 diagnoses whether or not the power-receiving-module-type telemeter transmitter 110 has an abnormality as shown in FIG. 10 based on the communication results aggregated in step S6.

First, the diagnosis unit 705 determines whether or not the communication of all the transmitting units 114 has succeeded for the entire circumference (step S7). In a case where the communication of all the transmitting units 114 has succeeded for the entire circumference (YES in step S7), the diagnosis unit 705 diagnoses that there is no abnormality in the power-receiving-module-type telemeter transmitter 110 (step S8).

Next (NO in step S7), the diagnosis unit 705 determines whether or not the communication of one transmitting unit 114 has failed for a part of the entire circumference and the communication of the other transmitting units 114 has succeeded for the entire circumference (step S9). In a case where the communication of one transmitting unit 114 has failed for a part of the entire circumference and the communication of the other transmitting units 114 has succeeded for the entire circumference (YES in step S9), the diagnosis unit 705 diagnoses that there is a possibility of malfunction in the transmitting unit 114 that has failed in communication for a part (step S10). For example, in a case where the transmitting unit 114A has failed in communication for a part and the transmitting unit 114B and the transmitting unit 114C have succeeded in communication for the entire circumference, the diagnosis unit 705 diagnoses that there is a possibility of malfunction in the transmitting unit 114A.

Next (NO in step S9), the diagnosis unit 705 determines whether or not the communication of the two transmitting units 114 has failed for a part of the entire circumference and the communication of the other transmitting units 114 has succeeded for the entire circumference (step S11). In a case where the communication of the two transmitting units 114 has failed for a part of the entire circumference and the communication of the other transmitting units 114 has succeeded for the entire circumference (YES in step S11), the diagnosis unit 705 diagnoses that the power receiving modules 111 connected to the two transmitting units 114 that have failed in communication have malfunctioned (step S12). For example, in a case where the transmitting unit 114A and the transmitting unit 114C have failed in communication for a part and the transmitting unit 114B has succeeded in communication for the entire circumference, the diagnosis unit 705 diagnoses that the power receiving module 111B connected to the transmitting unit 114A and to the transmitting unit 114C has malfunctioned. This is because there is a high probability that the transmitting unit 114A and the transmitting unit 114C are affected by fading due to the malfunction of the power receiving module 111B. Here, the diagnosis unit 705 diagnoses that there is also a possibility of malfunction in the two transmitting units 114 that have failed in communication.

Next (NO in step S11), the diagnosis unit 705 determines whether or not the communication of one or two transmitting units 114 has failed for the entire circumference and the communication of the other transmitting units 114 has succeeded for the entire circumference (step S13). In a case where the communication of one or two transmitting units 114 has failed for the entire circumference and the communication of the other transmitting units 114 has succeeded for the entire circumference (YES in step S13), the diagnosis unit 705 diagnoses that the transmitting unit 114 that has failed in communication has malfunctioned (step S14). For example, in a case where the transmitting unit 114B and the transmitting unit 114C have failed in communication for the entire circumference and only the transmitting unit 114A has succeeded in communication for the entire circumference, the diagnosis unit 705 diagnoses that there is a possibility of malfunction in the transmitting unit 114B and the transmitting unit 114C. In a case where there are two transmitting units 114 that have failed in communication for the entire circumference, the diagnosis unit 705 diagnoses that there is also a possibility of malfunction in the power receiving module 111 connected to the two. That is, in a case where only the transmitting unit 114A has succeeded in communication for the entire circumference, there is a possibility of malfunction in the power receiving module 111C connected to the transmitting unit 114B and to the transmitting unit 114C.

In a case where the communication of all the transmitting units 114 has failed for the entire circumference or failed for a part thereof (NO in step S13), the diagnosis unit 705 diagnoses that there is a possibility of malfunction in all the power receiving modules 111 and the transmitting units 114 (step S15).

Then, the notification unit 706 outputs display data indicating the diagnosis result of step S8, S10, S12, S14, or S15 to the display unit 123 (step S16). Accordingly, a user can be notified of the result of the malfunction diagnosis of the power-receiving-module-type telemeter transmitter 110 by the signal processing unit 122.

OTHER EMBODIMENTS

While one embodiment has been described in detail with reference to the drawings, the specific configuration is not limited to the above description, and various design changes and the like can be made. That is, in other embodiments, the order of the above-mentioned processes may be changed as appropriate. In addition, some processes may be executed in parallel.

The power-receiving-module-type telemeter transmitter 110 according to the first and second embodiments includes the two power receiving modules 111, but is not limited thereto. For example, the power-receiving-module-type telemeter transmitter 110 according to another embodiment may include three or more power receiving modules 111. The power-receiving-module-type telemeter transmitter 110 according to the third embodiment includes the three power receiving modules 111, the three OR circuits 112, the three sensors 113, and the three transmitting units 114, but the number is not limited thereto. For example, the power-receiving-module-type telemeter transmitter 110 according to another embodiment may include four or more power receiving modules 111, or may include four or more transmitting units 114. However, in a case where diagnosis of malfunction is performed as in the third embodiment, the number of OR circuits 112, the number of sensors 113, and the number of transmitting units 114 are the same.

The signal processing unit 122 according to the third embodiment may be configured by a single computer, or the configuration of the signal processing unit 122 may be divided into a plurality of computers so that the plurality of computers cooperate with each other to function as the signal processing unit 122.

(Configuration of Computer)

Figure 11:
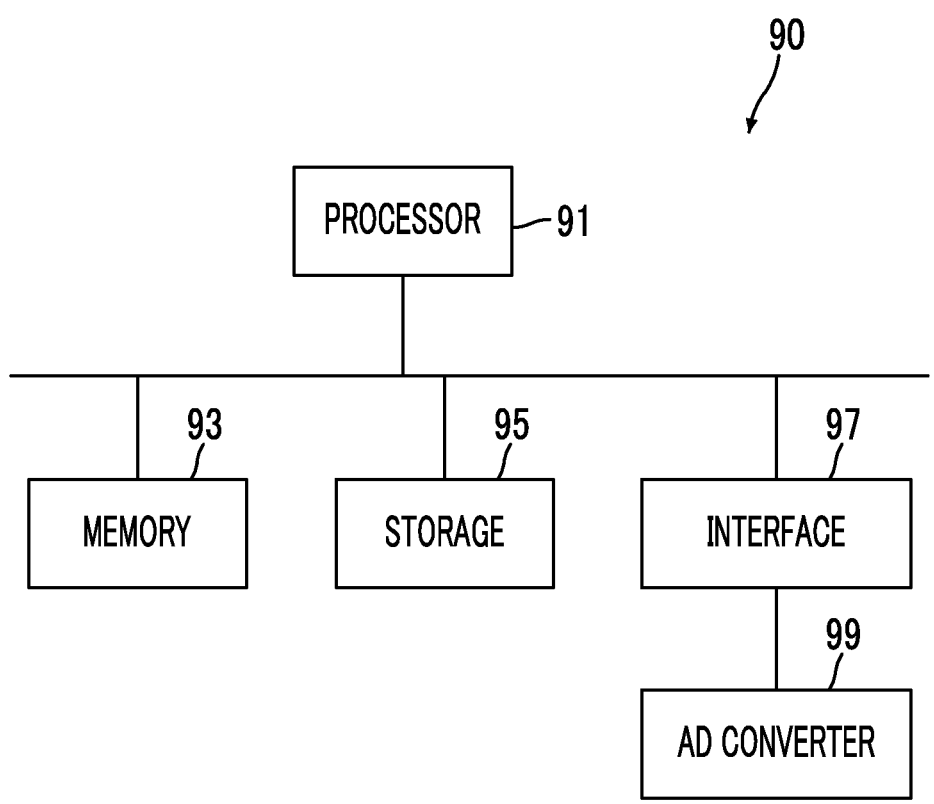
FIG. 11 is a schematic block diagram showing a configuration of a computer according to at least one embodiment.

FIG. 11 is a schematic block diagram showing the configuration of a computer according to at least one embodiment.

A computer 90 includes a processor 91, a memory 93, a storage 95, an interface 97, and an AD converter 99. The AD converter 99 converts the measurement signal received by the receiving antenna 121 and demodulated by the receiving unit (not shown) into a digital signal. The AD converter 99 transmits the digital signal to the processor 91 via the interface 97.

The signal processing unit 122 described above is mounted on the computer 90. The operation of each of the above-mentioned processing units is stored in the storage 95 or in the memory 93 in the form of a program. In a case where the program is stored in the storage 95, the processor 91 reads the program from the storage 95 and deploys the program into the memory 93. The processor 91 executes the above processes according to the program on the memory 93. In addition, the processor 91 secures a storage area corresponding to each of the above-mentioned storage units in the memory 93 according to the program. Examples of the processor 91 include a central processing unit (CPU), a graphics processing unit (GPU), and a microprocessor.

The program may be intended to realize some of the functions performed by the computer 90. For example, the program may perform its function in combination with another program already stored in the storage 95 or in combination with another program implemented in another device. In another embodiment, the computer 90 may include a custom large scale integrated circuit (LSI) such as a programmable logic device (PLD) in addition to or in place of the above configuration. Examples of the PLD include a programmable array logic (PAL), a generic array logic (GAL), a complex programmable logic device (CPLD), and a field programmable gate array (FPGA). In this case, some or all of the functions realized by the processor 91 may be realized by the corresponding integrated circuit. Such an integrated circuit is also included in an example of the processor 91.

Examples of the storage 95 include a magnetic disk, a magneto-optical disk, an optical disk, and a semiconductor memory. The storage 95 may be an internal medium directly connected to a bus of the computer 90, or an external medium connected to the computer 90 via the interface 97 or a communication line. In a case where this program is distributed to the computer 90 via the communication line, the computer 90 to which the program is distributed may deploy the program into the memory 93 and execute the above processes. In at least one embodiment, the storage 95 is a non-temporary tangible storage medium.

In addition, the program may be for realizing some of the above-mentioned functions. Furthermore, the program may be a so-called difference file (difference program) that realizes the above-mentioned functions in combination with another program already stored in the storage 95.

ADDITIONAL NOTES

The power-receiving-module-type telemeter transmitter (110), the telemeter measuring system (100), and the rotary machine according to each of the embodiments can be understood, for example, as follows.

(1) According to a first aspect, there is provided a power-receiving-module-type telemeter transmitter (110) of a telemeter measuring system (100) that is provided in a rotor and that performs communication using power received from a power transmitting antenna (131) formed in an arc shape on a stator side, the power-receiving-module-type telemeter transmitter (110) including: a plurality of power receiving modules (111) disposed in the rotor at intervals in a circumferential direction; an OR circuit (112) that outputs a highest voltage among voltages input from the plurality of power receiving modules (111); a sensor (113) that measures a state of a monitoring target and that outputs measurement data indicating the state; and a transmitting unit (114) that is driven by the voltage input from the OR circuit (112) as a power source and that transmits a radio signal including the measurement data of the sensor (113).

According to this aspect, the power-receiving-module-type telemeter transmitter (110) can be stably supplied with power by taking the maximum power received by the plurality of power receiving modules (111).

(2) According to a second aspect, in the power-receiving-module-type telemeter transmitter (110) according to the first aspect, the OR circuit (112) may include a plurality of diodes (521) and an output wire (522), anodes of the plurality of diodes (521) may be respectively connected to the plurality of power receiving modules (111), and cathodes of the plurality of diodes (521) may be connected to the output wire (522) in parallel.

According to this aspect, it is possible to prevent the current from flowing into the power receiving module (111) having a small output in the power-receiving-module-type telemeter transmitter (110).

(3) According to a third aspect, the power-receiving-module-type telemeter transmitter (110) according to the first or second aspect may further include: a plurality of DC/DC converters (513) that respectively convert the voltages output by the plurality of power receiving modules (111) into predetermined voltage values, in which the OR circuit (112) may output a highest voltage among voltages input from the plurality of DC/DC converters (513).

With the configuration of this aspect, the configuration of the power-receiving-module-type telemeter transmitter (110) of the present disclosure can be easily applied to an existing power-receiving-module-type telemeter transmitter.

(4) According to a fourth aspect, the power-receiving-module-type telemeter transmitter (110) according to the first or second aspect may further include: a DC/DC converter (115) that converts the voltage output by the OR circuit (112) into a predetermined voltage value, in which the transmitting unit (114) may be driven by the voltage input from the DC/DC converter (115) as a power source.

According to this aspect, the output voltage of the DC/DC converter (115) can be supplied to the transmitting unit (114) without being affected by a voltage drop caused by the diode (521).

(5) According to a fifth aspect, the power-receiving-module-type telemeter transmitter (110) according to any one of the first to fourth aspects may further include: a plurality of OR circuits (112) including the OR circuit (112); and a plurality of transmitting units (114) including the transmitting unit (114) and provided corresponding to the plurality of OR circuits (112), in which the plurality of power receiving modules (111) are connected to some of the plurality of OR circuits (112), the plurality of OR circuits (112) are connected to two power receiving modules (111) among the plurality of power receiving modules (111), and the plurality of transmitting units (114) are respectively driven by voltages input from the plurality of OR circuits (112) as power sources.

According to this aspect, it is possible to determine the malfunction state of the power-receiving-module-type telemeter transmitter (110) based on the communication results of the plurality of transmitting units (114).

(6) According to a sixth aspect, a telemeter measuring system (100) includes: the power-receiving-module-type telemeter transmitter (110) according to any one of the first to fifth aspects; the power transmitting antenna (131) provided in a stator and formed in an arc shape; an oscillator (132) that supplies a high-frequency signal to the power transmitting antenna (131); a receiving antenna (121) provided in the stator and formed in an arc shape; and a receiving unit that receives the radio signal from the power-receiving-module-type telemeter transmitter (110) via the receiving antenna (121).

(7) According to a seventh aspect, a telemeter measuring system (100) includes: the power-receiving-module-type telemeter transmitter (110) according to the fifth aspect; a power transmitting antenna (131) provided in a stator and formed in an arc shape; an oscillator (132) that supplies a high-frequency signal to the power transmitting antenna (131); a receiving antenna (121) provided in the stator and formed in an arc shape; a receiving unit that receives the radio signal from the power-receiving-module-type telemeter transmitter (110) via the receiving antenna (121); a determination unit (702) that determines success or failure of reception of radio signals from the plurality of transmitting units (114) in the receiving unit; and a diagnosis unit (705) that diagnoses malfunction of the receiving antenna (121) or of the transmitting unit (114) based on the success or failure of the reception.

(8) According to an eighth aspect, a rotary machine includes: a stator; a rotor that has a rotating shaft rotating about an axis (O) with respect to the stator, and a plurality of rotor blades that are provided so as to radially extend from an outer peripheral surface of the rotating shaft; and the telemeter measuring system (100) according to the sixth or seventh aspect, in which the sensor (113) is provided in each of the rotor blades.

(9) According to a ninth aspect, there is provided a telemeter transmission method, in which a power-receiving-module-type telemeter transmitter (110) of a telemeter measuring system (100) that is provided in a rotor and that performs communication using power received from a power transmitting antenna (131) formed in an arc shape on a stator side is used, the power-receiving-module-type telemeter transmitter (110) including a plurality of power receiving modules (111) disposed in the rotor at intervals in a circumferential direction, a sensor (113) that measures a state of a monitoring target and that outputs measurement data indicating the state, and a transmitting unit (114) that transmits a radio signal including the measurement data of the sensor (113), the telemeter transmission method including: a step of receiving power from the power transmitting antenna (131) via the plurality of power receiving modules (111); a step of driving the transmitting unit (114) using a highest voltage among voltages input from the plurality of power receiving modules (111) as a power source; and a step of transmitting a radio signal including the measurement data of the sensor (113) via the transmitting unit (114).

INDUSTRIAL APPLICABILITY

The present invention relates to a power-receiving-module-type telemeter transmitter, a telemeter measuring system, a rotary machine, and a telemeter transmission method.

According to the present invention, power can be stably received from an annular power transmitting antenna.

REFERENCE SIGNS LIST

1 Gas turbine
100 Telemeter measuring system
110 Power-receiving-module-type telemeter transmitter
111 Power receiving module
112 OR circuit
113 Sensor
114 Transmitting unit
115 DC/DC converter
120 Receiving device
121 Receiving antenna
130 Power supply device
131 Power transmitting antenna
132 Oscillator
511 Power receiving antenna
513 DC/DC converter
521 Diode
522 Output wire
702 Determination unit
705 Diagnosis unit

The invention claimed is:
1. A power-receiving-module-type telemeter transmitter of a telemeter measuring system disposed in a rotor and that performs communication using power received from a power transmitting antenna formed in an arc shape on a stator, the power-receiving-module-type telemeter transmitter comprising:

three or more power receiving modules disposed in the rotor at intervals in a circumferential direction;

a same number of OR circuits as the power receiving modules, wherein the OR circuits each output a highest voltage among voltages input from the power receiving modules;

the same number of sensors that each measure a state of a monitoring target and output measurement data indicating the state of the monitoring target; and the same number of transmitting units that are each driven by the highest voltage from a corresponding one of the OR circuits as a power source and that transmit a radio signal including the measurement data of a corresponding one of the sensors, wherein each of the OR circuits is connected to two of the power receiving modules, and the transmitting units are respectively driven by first voltages input from the OR circuits as power sources.

2. The power-receiving-module-type telemeter transmitter according to claim 1, wherein each of the OR circuits comprises diodes and an output wire, anodes of the diodes are respectively connected to the power receiving modules, and cathodes of the diodes are connected to the output wire in parallel.

3. The power-receiving-module-type telemeter transmitter according to claim 1, further comprising:

DC/DC converters that convert second voltages output by the power receiving modules into predetermined voltage values, wherein each of the OR circuits outputs the highest voltage among third voltages input from the DC/DC converters.

4. The power-receiving-module-type telemeter transmitter according to claim 1, further comprising:

DC/DC converters that convert fourth voltages output by the OR circuits into predetermined voltage values, wherein the transmitting units are driven by third voltages input from the DC/DC converters as power sources.

5. A telemeter measuring system comprising:

the power-receiving-module-type telemeter transmitter according to claim 1;

the power transmitting antenna in the stator;

an oscillator that supplies a high-frequency signal to the power transmitting antenna;

a receiving antenna of the arc shape in the stator; and a receiving unit that receives the radio signal from the power-receiving-module-type telemeter transmitter via the receiving antenna.

6. A telemeter measuring system comprising:

the power-receiving-module-type telemeter transmitter according to claim 1;

the power transmitting antenna in the stator;

an oscillator that supplies a high-frequency signal to the power transmitting antenna;

a receiving antenna of the arc shape disposed in the stator;

a receiving unit that receives the radio signal from each of the transmitting units of the power-receiving-module-type telemeter transmitter via the receiving antenna;

a determination unit that determines success or failure of reception of the radio signal from each of the transmitting units in the receiving unit; and a diagnosis unit that diagnoses malfunction of the receiving antenna or of the transmitting units based on the success or the failure of the reception.

7. A rotary machine comprising:

the telemeter measuring system according to claim 5;

the stator; and the rotor, wherein the rotor comprises:

a rotating shaft rotating about an axis with respect to the stator, and rotor blades that radially extend from an outer peripheral surface of the rotating shaft; and each of the sensors is disposed in each of the rotor blades.

8. A telemeter transmission method, in which a power-receiving-module-type telemeter transmitter of a telemeter measuring system disposed in a rotor and that performs communication using power received from a power transmitting antenna formed in an arc shape on a stator is used, the power-receiving-module-type telemeter transmitter comprising three or more power receiving modules disposed in the rotor at intervals in a circumferential direction, a same number of OR circuits as the power receiving modules, wherein the OR circuits each output a highest voltage among voltages input from the power receiving modules, the same number of sensors that each measure a state of a monitoring target and output measurement data indicating the state the state of the monitoring target, and the same number of transmitting units that are each driven by the highest voltage from a corresponding one of the OR circuits as a power source and that transmit a radio signal including the measurement data of a corresponding one of the sensors, wherein each of the OR circuits is connected to two of the power receiving modules, and the transmitting units are respectively driven by first voltages input from the OR circuits as power sources, the telemeter transmission method comprising:

a step of receiving power from the power transmitting antennas via the power receiving modules;

a step of driving a corresponding one of the transmitting units using the highest voltage from the corresponding one of the OR circuits; and a step of transmitting the radio signal via the transmitting units.

* * * * *